Patented Nov. 18, 1941

2,263,444

UNITED STATES PATENT OFFICE 2,263,444

β(2.4.6-TRICHLOROPHENOXY)β'-PHENOXY-DIETHYL ETHER

Clarence L. Moyle, Midland, Mich., assignor to The Dow Chemical Company, Midland, Mich., a corporation of Michigan No Drawing. Application August 28, 1939, Serial No. 292,243

1 Claim. (Cl. 260—613)

This invention relates to β(2.4.6 trichlorophenoxy) β' phenoxy-diethyl ether.

It is known that the aromatic ethers of polyalkylene glycols, such as diethylene glycol, triethylene glycol, ethylene propylene diglycol, etc., are useful as plasticizing agents in the preparation of synthetic resin molding compositions in which styrene co-polymers are employed as the thermoplastic base material. Among such aromatic ethers, those containing one or more neutral substituents, e. g. halogen, alkyl, cycloalkyl, alkoxy, and aryl substituents, in the aromatic nuclei, have been found to be particularly useful for such purpose, since they effect the desired plasticizing action on the styrene co-polymers without unduly reducing the mechanical strength of the same. In some cases the plasticized compositions even show improved strength characteristics because of the improved molding secured through the use of these plasticizing agents. However, many of the symmetrical aromatic ethers of the polyalkylene glycols, i. e. the ethers in which both aromatic radicals are the same, are crystalline solids at ordinary temperatures, and this property detracts somewhat from their utility as plasticizing agents, since they have a tendency to crystallize and exude to the surface of the compositions into which they have been incorporated, thereby causing blushing or blooming of the plasticized compositions.

I have now found that the mixed aromatic ethers of the polyalkylene glycols, i. e. the ethers wherein the aromatic radicals are different, are in most cases high-boiling colorless liquid products which possess substantially the same plasticizing action on styrene co-polymers as do the symmetrical ethers, but which, because of their liquid state, do not crystallize and exude to the surface of the compositions into which they are incorporated. The invention, then, concerns new mixed aromatic ethers having the general formula Y—O—(RO)$_n$—R'—O—Y' wherein Y and Y' represent different aromatic radicals, R and R' represent the same or different lower alkylene groups containing from two to five carbon atoms, and $n$ represents an integer not greater than four. The aromatic radicals represented by Y and Y' may both be unsubstituted, e. g. phenyl, naphthyl, etc., but I prefer that at least one of such radicals contain one or more neutral substituents, such as halogen, alkyl, cycloalkyl, alkoxy, or aryl groups. The compounds having the above general formula are for the most part colorless liquids having low volatility, good heat stability, and do not appreciably discolor upon prolonged exposure to light. They are soluble in a wide variety of organic solvents and are compatible with styrene co-polymers as well as with cellulose ethers and esters, vinyl resins, and other synthetic plastic materials.

Examples of the new mixed aromatic ethers of the present class are β-phenoxy-β'-naphthoxy-diethyl ether, β-phenoxy-β'-(2-chlorophenoxy)-diisopropyl ether, β-(2,4-dimethyl-phenoxy)-ethyl-γ-(4-ethyl-phenoxy)-n-propyl ether, β-(2-xenoxy)-β'-(4-tertiarybutyl-phenoxy)-diethyl ether, β-(2-hexyl-phenoxy)-β'-(β-phenoxy-ethoxy)-diethyl ether, γ-(2-xenoxy)-propyl β-(2.4.6-trichlorophenoxy)-ethyl ether, β-(4-cyclohexyl-phenoxy)-β'-(4-tertiarybutyl-phenoxy)-diisobutyl ether, β-(β-phenoxy-ethoxy)-ethoxy-β'-(2.4-di-n-propyl-phenoxy)-diethyl ether, γ-(2-methyl-5-isopropyl-phenoxy)-butyl γ-(β-naphthoxy)-propyl ether, γ-phenoxy-γ'-(3-methyl-phenoxy)-diamyl ether, γ-(γ-(2-xenoxy)-propoxy)-propyl β-(2-ethyl-phenoxy)-tertiarybutyl ether, β-(β-(β-phenoxy-ethoxy)-ethoxy)-ethoxy-β'-(2-bromo-phenoxy)-diethyl ether, β-(2-chloro-5-hexyl-phenoxy)-ethyl γ-(2-methoxy-phenoxy)-butyl ether, β-(4-isopropoxy-phenoxy)-β'-(2-tertiaryoctyl-phenoxy)-diethyl ether, γ-(β-amyl-naphthoxy - γ' -naphthoxy - di - n - propyl ether, β-(β-phenoxy-ethoxy)-ethoxy-β'-(2.4.6-trimethyl-phenoxy)-diethyl ether, etc.

The mixed aromatic ethers of the present class are readily prepared by reacting a metal phenolate (or a mixture of a phenolic compound and a metal hydroxide) with an aryloxy polyalkylene ether halide, in accordance with the equation Y—O—(RO)$_n$—R'—X+Y'OM→
 Y—O—(RO)$_n$—R'—O—Y'+MX wherein X represents halogen, M represents a metal, Y and Y' represent different aromatic radicals, R and R' represent lower alkylene groups containing at least two carbon atoms, and $n$ represents a small integer. The aryloxy polyalkylene ether halide reactant may be prepared by reacting a metal phenolate with a halogenated polyalkylene ether, such as β.β'-dichloro-diethyl ether, γ.γ'-dibromo-dipropyl ether, β-chloroethyl β-chloro-propyl ether, etc. The phenolate reactant is preferably an alkali-metal, e. g. sodium or potassium, compound, although phenolates of other metals can be used. It will be understood, of course, that in order to obtain the mixed ethers of the present class, it is necessary that the phenolic reactant be different from that employed in preparing the aryloxy polyalkylene ether halide.

The reaction is conveniently carried out simply by heating to a reaction temperature a mixture of the aryloxy polyalkylene ether halide, the phenolic reactant, and an alkali-metal hydroxide, in the presence or absence of a reaction medium, such as water, alcohol, benzene, etc. The reactants are preferably employed in equimolecular proportions, although other proportions may be used. The reaction occurs smoothly at temperatures between 100° C. and 175° C., but, if desired, it may be carried out at higher temperatures, e. g. 225° C. It may be effected by heating the reaction mixture under reflux at atmospheric pressure or by heating under pressure in a bomb or autoclave. The time of heating required to complete the reaction varies from about two to fourteen hours, depending upon the particular reactants employed, the temperature at which the reaction is carried out, etc. Upon completion of the reaction, the mixture is washed to remove the alkali-metal halide by-product and any unreacted alkali-metal phenolate, and the mixed aromatic ether product is recovered and purified by conventional procedure, e. g. by fractional distillation.

The following examples will illustrate several ways in which the principle of the invention has been applied but are not to be construed as limiting the invention.

*Example 1*

A mixture of 273.6 grams (0.9 mole) of β-chloro-β'-(2.4.6-trichlorophenoxy)-diethyl ether, 84.6 grams (0.9 mole) of phenol, and 37.5 grams (0.9 mole) of 96 per cent flake sodium hydroxide was placed in a pressure vessel and heated at a temperature of about 150° C. for approximately 12 hours. The mixture was then cooled and fractionally distilled under vacuum whereby the β-(2.4.6-trichlorophenoxy)-β'-phenoxy-diethyl ether product was obtained as a very pale yellow, mobile liquid distilling at approximately 232°–236° C. under 5 millimeters pressure, and having a specific gravity of about 1.328 at 25/25° C. and a refractive index at 25° C. of about 1.5696. It will be noted that this product is a permanent liquid although both β.β'-di-phenoxy-diethyl ether and β.β'-di-(2.4.6-trichlorophenoxy)-diethyl ether are crystalline solids melting at 63.5–64.5° C. and 88°–89° C., respectively.

*Example 2*

A mixture of 180.4 grams (0.9 mole) of β-chloro-β'-phenoxy-diethyl ether, 158.4 grams (0.9 mole) of 2-cyclohexyl-phenol, and 37.5 grams (0.9 mole) of 96 per cent flake sodium hydroxide was heated at a temperature of approximately 175° C. for 8 hours as in Example 1. The crude reaction product was then cooled, washed with water, and fractionally distilled under vacuum. β-(2-cyclohexyl-phenoxy)-β'-phenoxy-diethyl ether was obtained as a colorless viscous liquid distilling at approximately 238°–242° C. under 5 millimeters pressure, and having a specific gravity of about 1.177 at 25/25° C. and a refractive index of 1.5489 at 25° C.

*Example 3*

A mixture of 179.5 grams (0.7 mole) of β-(4-tertiarybutyl-phenoxy)-β'-chloro-diethyl ether, 75.6 grams (0.7 mole) of mixed cresols, and 29.2 grams (0.7 mole) of 96 per cent flake sodium hydroxide was heated at 150° C. for 10 hours as in Example 1. The reaction product was cooled, washed twice with water, and was fractionally distilled under vacuum whereby the β-(4-tertiarybutyl-phenoxy)-β'-toloxy-diethyl ether product was obtained as a colorless liquid distilling at approximately 230°–235° C. under 5 millimeters pressure, and having a specific gravity of about 1.038 at 25/25° C. and a refractive index of 1.5344 at 25° C.

While by far a large majority of the compounds of the present class are permanent liquids, in a few instances they are obtained as crystalline solids which, however, usually have melting points so low that they display little tendency to crystallize from compositions in which they are employed as plasticizing agents. An example of such a compound is β-(2-xenoxy)-β'-(2.4.6-trichlorophenoxy)-diethyl ether, which may be prepared by reacting β-chloro-β'-(2.4.6-trichlorophenoxy)-diethyl ether with 2-phenyl-phenol in the presence of sodium hydroxide as in Example 1. This compound is initially obtained as a colorless liquid distilling at approximately 282°–286° C. at 5.6 millimeters and having a specific gravity of about 1.308 at 25° C. Upon long standing, however, it gradually solidifies to a white crystalline solid melting at approximately 46°–48° C.

Other modes of applying the principle of my invention may be employed instead of those explained, change being made as regards the materials employed, provided the product stated by the following claim be obtained.

I therefore particularly point out and distinctly claim as my invention:

β-(2.4.6-trichloro-phenoxy)-β'-phenoxy-diethyl ether, a pale-yellow mobile liquid distilling at approximately 232°–236° C. under 5 millimeters pressure and having a specific gravity of about 1.328 at 25/25° C. and the formula

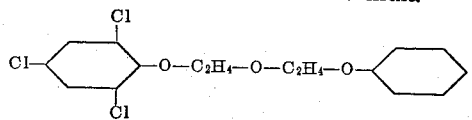

CLARENCE L. MOYLE.